(12) United States Patent
Prendergast et al.

(10) Patent No.: US 7,504,918 B2
(45) Date of Patent: Mar. 17, 2009

(54) MAGNETICALLY ACTIVATED SWITCH

(75) Inventors: Jonathon R. Prendergast, Newport Beach, CA (US); Charles R. Patton, III, Murrieta, CA (US)

(73) Assignee: Norotos, Inc., Santa Ana, CA (US)

( * ) Notice: Subject to any disclaimer, the term of this patent is extended or adjusted under 35 U.S.C. 154(b) by 109 days.

(21) Appl. No.: 11/473,749

(22) Filed: Jun. 23, 2006

(65) Prior Publication Data

US 2006/0290451 A1 Dec. 28, 2006

Related U.S. Application Data

(60) Provisional application No. 60/711,876, filed on Aug. 26, 2005, provisional application No. 60/693,554, filed on Jun. 23, 2005.

(51) Int. Cl.
*H01H 9/00* (2006.01)

(52) U.S. Cl. .......................... 335/205; 335/41; 335/93; 335/151; 335/152; 335/153; 335/162; 335/163; 335/177; 335/206; 335/207; 335/236; 335/244; 335/286; 335/304

(58) Field of Classification Search ............... 335/41, 335/93, 151–154, 162, 163, 177, 205–207, 335/236, 244, 286, 304
See application file for complete search history.

(56) References Cited

U.S. PATENT DOCUMENTS

| 3,022,398 | A |   | 2/1962 | Abel |  |
|---|---|---|---|---|---|
| 3,114,020 | A | * | 12/1963 | Hall | 335/207 |
| 3,184,563 | A | * | 5/1965 | Myatt | 335/153 |
| 3,205,323 | A | * | 9/1965 | Deshautreaux, Jr. | 335/207 |
| 3,510,813 | A | * | 5/1970 | Bozzone | 335/205 |
| 3,560,846 | A |   | 2/1971 | Bessko |  |
| 4,165,935 | A | * | 8/1979 | Bongort et al. | 335/207 |
| 4,224,588 | A |   | 9/1980 | Holvoet et al. |  |
| 4,271,763 | A |   | 6/1981 | Berger |  |
| 4,296,394 | A |   | 10/1981 | Ragheb |  |
| 4,491,792 | A |   | 1/1985 | Bullock et al. |  |

(Continued)

FOREIGN PATENT DOCUMENTS

EP 0 280 452 A1 8/1988

OTHER PUBLICATIONS

International Search Report and Written Opinion, dated Jun. 24, 2008, for International Application No. PCT/US06/24651, 11 sheets.

*Primary Examiner*—Elvin G Enad
*Assistant Examiner*—Mohamad A Musleh
(74) *Attorney, Agent, or Firm*—Christie, Parker & Hale, LLP

(57) ABSTRACT

An apparatus for sensing relative positions of mechanically coupled devices. The apparatus includes a magnetically actuated switch connected to a set of flux conductors to form a switch assembly. A permanent magnet is affixed to a set of flux conductors to form a magnet assembly. The flux conductors are positioned adjacently to conduct flux from the permanent magnet to the magnetically actuated switch. Movement of either assembly results in the reduction of flux conduction between the magnet and the magnetically actuated switch. The apparatus can be integrated into a helmet mount for night vision goggles to sense the relative position of the helmet mount for controlling the operation of the night vision goggle.

39 Claims, 12 Drawing Sheets

U.S. PATENT DOCUMENTS

| | | | | |
|---|---|---|---|---|
| 4,737,751 A * | 4/1988 | Risk | ............................ | 335/207 |
| 5,233,322 A | 8/1993 | Posey | | |
| 5,373,125 A * | 12/1994 | Ford et al. | ............... | 200/61.52 |
| 5,408,086 A | 4/1995 | Morris et al. | | |
| 5,422,616 A * | 6/1995 | Jackman | ..................... | 335/205 |
| 5,635,887 A | 6/1997 | Fischette et al. | | |
| 5,877,664 A * | 3/1999 | Jackson, Jr. | .................. | 335/205 |
| 6,313,724 B1 | 11/2001 | Osterweil | | |
| 6,359,538 B1 | 3/2002 | Jolley et al. | | |
| 6,590,763 B2 | 7/2003 | Kishimoto | | |
| 6,759,932 B2 | 7/2004 | Nishikawa | | |
| 6,862,748 B2 * | 3/2005 | Prendergast | .................... | 2/422 |
| 7,151,461 B2 * | 12/2006 | Wilson et al. | ............... | 340/644 |

\* cited by examiner

MAGNETICALLY ACTIVATED SWITCH

CROSS-REFERENCE TO RELATED APPLICATIONS

This application claims priority to and the benefit of Provisional Application No. 60/693,554, filed in the United States Patent Office on Jun. 23, 2005, and Provisional Application No. 60/711,876, filed in the United States Patent Office on Aug. 26, 2005, the entire disclosure of each of which is incorporated herein by reference.

TECHNICAL FIELD

This invention relates generally to magnetically activated (or actuated) switches that use flux conveyed by flux conductors from a magnet to actuate a magnet sensor when certain physical alignments occur, and more particularly to a magnetically activated switch for a night vision goggle mount that is activated in an in-use position and deactivated in either a quick stowage or a flip-up stowage position.

BACKGROUND

Permanent magnets have been widely used in proximity switch applications. Sensing actions have generally been accomplished by bringing the magnet sufficiently close to a sensor, for example, a reed switch, to cause it to actuate. The accuracy of position sensing is generally poor as position sensing is strongly dependent on the sensitivity of the reed switch and on the field strength of the magnet, which varies over temperature and initial magnetization. Furthermore, certain applications require careful balancing of the flux fields of multiple magnets to achieve their results.

Night vision goggles (NVG) are commonly used by military personnel for conducting operations in low light or night conditions. The NVG used by the military typically include image intensifier tubes and associated viewable images. Assemblies for mounting NVG to a helmet are well-known in the art. These mounting assemblies allow a user's hands to remain free while viewing a scene through the NVG. Prior mounting assemblies typically include one or more of the following features: positional adjustment of the NVG between an in-use and a flip-up stowage position, tilt angle adjustment of the NVG relative to a user's eyes, focal adjustment of the location of the NVG relative to the user's eyes, and an automatic shutdown of the NVG when the NVG are not in the in-use position.

There is a need to have a reliable and effective automatic shutdown of the NVG when the NVG are not in use. An automatic shutdown allows the user to simply move the NVG out of the user's line of site and allow the user to rely on the NVG to turn off automatically, eliminating the need for a user to activate a switch to turn off the NVG. Many options have been considered to achieve automatic shutdown. Sliding contacts have not been practical because of the severe environmental requirements. Previous proximity switch techniques have also not been satisfactory due to limited space and lack of well defined switch points. Furthermore, standard proximity detector approaches require multiple switches and magnets to logically combine the results of different sensor positions.

The use of a system capable of being environmentally sealed, such as reed switches, provides excellent environmental immunity. There are known methods for automatic shutdown using a magnet module in a cavity, such as allowing a magnet to rotate within a cavity as the user moves the NVG from an in-use position to a flip-up position. However, automatic shutdown may be mistakenly triggered while the user is performing certain combat maneuvers such as rolling over. Since a user's "night vision" and safety may be affected during a critical moment of combat by the mistaken shutdown of the NVG, there is a need for a switch to be coupled to NVG that would reduce or eliminate the possibility of the NVG being accidentally turned off.

Moreover, when the NVG are flipped up, the user has a tendency to forget about their presence. The NVG may protrude beyond the user's helmet and be damaged if the user inadvertently bumps into the surrounding environment, such as the roof inside a vehicle. It is desired for the helmet mount to have a quick stowage feature that allows the night vision goggles to move out of the line of sight, but still within the peripheral vision range to serve as a constant reminder of the presence and location of the NVG. Therefore, it is desired that the switch be able to turn off in both the quick stowage and flip-up stowage positions.

Prior NVG designs are adapted to allow a user to use both eyes for viewing. The NVG is placed directly in front of both eyes and displays an image to both eyes. When a user operates the NVG during low light conditions, a bright light may essentially blind the user through over-exposure of light, disorienting the user for a period of time until the eyes readjust. To limit this problem, it is desired to use a monocular night vision goggle that will provide information to only one eye. The user simultaneously sees an unobstructed view through one eye and an enhanced image in the other. It is desired that the user can locate the night vision goggle in front of either eye, based upon preference or need. Therefore, it is desired that a single helmet mount be used for either eye, eliminating the need for a right eye helmet mount and a left eye helmet mount. Furthermore, it is desired that one switch be used for the helmet mount for both the right eye and left eye.

Thus, there is a need for an improved switch that operates reliably during movement of the NVG from an in-use position to a quick stowage or flip-up stowage position. Furthermore, there is a need for an improved switch to operate when the NVG is in either the right eye position or the left eye position.

SUMMARY

To overcome limitations in the prior art, and to overcome other limitations that will become apparent upon reading and understanding the present specification, in one embodiment the present invention relates to an apparatus for sensing relative positions of mechanically coupled devices. For example, based on relative positions of one or more devices such as a magnet, flux conductors and a magnetically activated switch, the apparatus may control the flow of magnetic flux through one or more flux conductors and a magnetically activated switch.

An apparatus constructed in accordance with one embodiment of the present invention has a magnetically actuated switch with a first switch end and second switch end. The first switch end has affixed an incoming electrical lead. The second switch end has affixed an outgoing electrical lead. This allows the flow of electrical current through the magnetically activated switch to be controlled depending on whether the switch is magnetically activated. A first switch end flux conductor is affixed to the first switch end. A second switch end flux conductor is affixed to the second switch end. A magnet, e.g., a permanent magnet, is mounted at a non-actuating position. For example, the magnet may be located a given distance away from the magnetically actuated switch or the magnet may be positioned near a flux shunt. The magnet has a first magnetic end and a second magnetic end. A first magnetic end flux conductor is affixed to or positioned adjacent to the first magnetic end. A second magnetic end flux conductor is affixed to or positioned adjacent to the second magnetic end. The first magnetic end flux conductor is proximate to the first switch end flux conductor and separated by a first gap. The second magnetic end flux conductor is proximate to the second switch end flux conductor separated by a second gap. When the first and second gap is small, magnetic flux will flow activating the magnetically activated switch to, depending on the particular application, open or close contacts in the switch.

In one embodiment, the permanent magnet, first magnetic end flux conductor and second magnetic end flux conductor can be affixed together into a magnet assembly for movement to increase and decrease the first and second gap. In another embodiment, a flux shunt can be placed adjacent to the first and second switch end flux conductor, so that the magnet assembly may move closer to the flux shunt and away from the first and second switch end flux conductor. This stops or reduces flux flow to the magnetically actuated switch. In various embodiments, the apparatus can be integrated into a helmet mount for a night vision goggle so that it may sense the relative position of the helmet mount to control operation of the night vision goggle.

BRIEF DESCRIPTION OF THE DRAWINGS

FIG. 9, including

DETAILED DESCRIPTION

Figure 1:
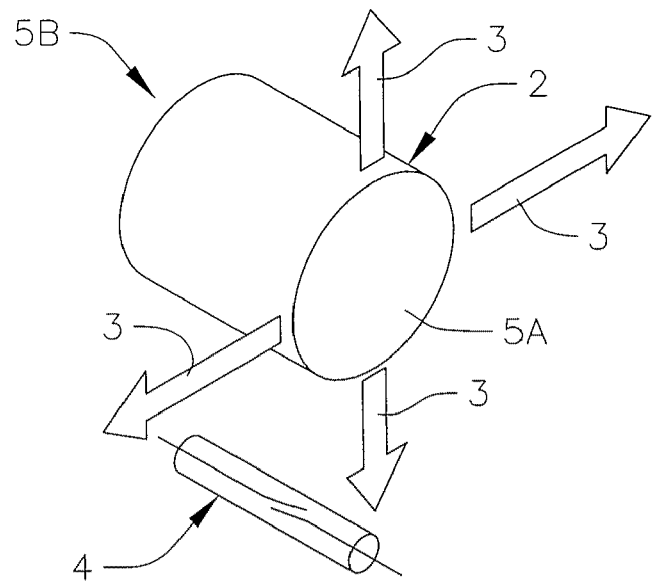
FIG. 1 shows a conventional magnet and reed switch.

A magnetically activated switch is controlled according to relative positions of associated magnetic flux-affecting components. For example, a magnetically activated switch may be activated based on the position of one or more devices such as one or more magnets, one or more flux conductors, and a switch. In some embodiments the magnetically activated switch uses flux from a permanent magnet to actuate a magnet sensor when a certain proximity between the magnet and the magnet sensor is achieved. In some embodiments a magnet sensor may be actuated by moving one or more flux conductors that alter the path of the flux.

In conventional magnetic switches, the accuracy of position sensing has been generally poor as position sensing is strongly dependent on the field strength of the magnet which varies over temperature, initial magnetization, and the sensitivity of the switch. Furthermore, certain magnetic switch applications require careful balancing of the flux fields of multiple magnets to achieve their desired results.

Through the addition of flux conductors, performance and reliability of the magnetically activated switch may be improved. One such use for a magnetically activated switch is to activate/deactivate night vision goggles (NVG) mounted on a helmet mount. The helmet mount may incorporate a magnetically activated switch to activate the NVG when the NVG are in an in-use position and to deactivate the NVG when they are in a stowage position. Of course, a magnetically activated switch may also be useful in other interfaces where the components of the interface move with respect to one another and where the position of the switch is determined by the relative location of the components of the interface with respect to one another.

The magnetically activated switch is designed to conduct enough flux from the magnet to a switch such as a reed switch to activate the switch. Additionally, the magnetically activated switch provides alternate flux paths to control the reluctance in the path such as through air gaps, lower permeability magnetic materials, or non-magnetic materials such as aluminum to control the reed switch. In one embodiment, by providing pairs of flux conductors, one for the flux to the reed switch and the other as a return path to the magnet, and arranging the pairs of conductors to be moved in and out of alignment, a rapid and high ratio of ON to OFF flux values is achieved. The rapid and high ratio of ON to OFF flux values allow the magnet field created to be much stronger than the minimum magnet field strength required for actuation while ensuring that the switch will not actuate in the OFF position. Furthermore, providing a pair of flux conductors allows the magnetically activated switch to work over a wide temperature range despite permanent magnet strength variations over temperature and varying switch sensitivity. The use of a pair of flux conductors requires only one magnet and one reed switch activated by simple flux conductors between them, even in the presence of movement and varying position.

In addition to the use of flux conductors, another exemplary embodiment of the present invention includes a flux shunt. By moving the flux conductors into alignment with an adjacent flux shunt, or vice versa, at least a potion of the flux may be shorted through an alternate path, thus removing the flux from the reed switch. Consequently, the reed switch may be turned off with an even shorter physical displacement of the flux conductors and/or flux shunt.

The use of the flux conductors allows the switch to be controlled in accordance with Boolean logic operations. That is, the switch may be controlled in accordance with a logical AND function, a logical OR function, a logical NOT function and combinations of these functions (e.g., NAND, NOR, etc.). As an example, if a helmet mount has more than one stowage position, the magnetically activated switch may, in effect, sense movement in more than one direction. Here, the flux conductors can be arranged in an AND function equivalent so that two sets of flux conductors must be aligned to activate the switch. In other applications it may be desirable to form the physical equivalent of the OR function by providing an additional set of flux conductors in parallel from the magnet to the reed switch. In this case, the switch may be activated by proper physical alignment of any one of the parallel sets of flux conductors. A switch may be controlled in accordance with a logical NOT function, for example, through the use of a single pole, double throw ("SPDT") reed switch. Such a switch may have a pair of contacts where one contact is a normally closed switch contact and the other is a normally open switch contact. Here, in some embodiments a signal may be coupled to the normally closed switch contact and no signal coupled to the normally open switch contact. Consequently, a signal may be coupled from the normally closed switch contact through the switch in a non-activated state, and no signal coupled from the normally opened contact through the switch in an activated state. Thus, an output signal from the switch may be deactivated when the switch is activated (one form of a NOT function). These and other aspects of logical operations that may be used in the context of a magnetically activated switch are discussed in more detail below in conjunction with FIGS. 4, 7, 8 and 10.

Various embodiments for a magnetic switch are described below. FIGS. 1-8 describe a magnetic switch in a general conceptual manner. FIGS. 9-15 describe particular embodiments of a magnetic switch that may be incorporated into a helmet mount for NVG.

FIG. 1 shows a conceptual embodiment of the prior art where a permanent magnet 2 is moved in different directions indicated by arrows 3 to activate and de-activate a reed switch 4. As is known, moving a permanent magnet 2 closer to and farther away from the reed switch 4 causes switching of electrical current flow through the reed switch 4 as a result of the magnetic flux (not shown in FIG. 1) that flows from a pole face 5A on one end of the magnet 4 to a pole face 5B (not visible in the perspective of FIG. 1) on another end of the magnet 4. The precise switching point is difficult to define due to variations in magnet strength, reed switch sensitivity and hysteresis of the reed switch 4.

Figure 2:
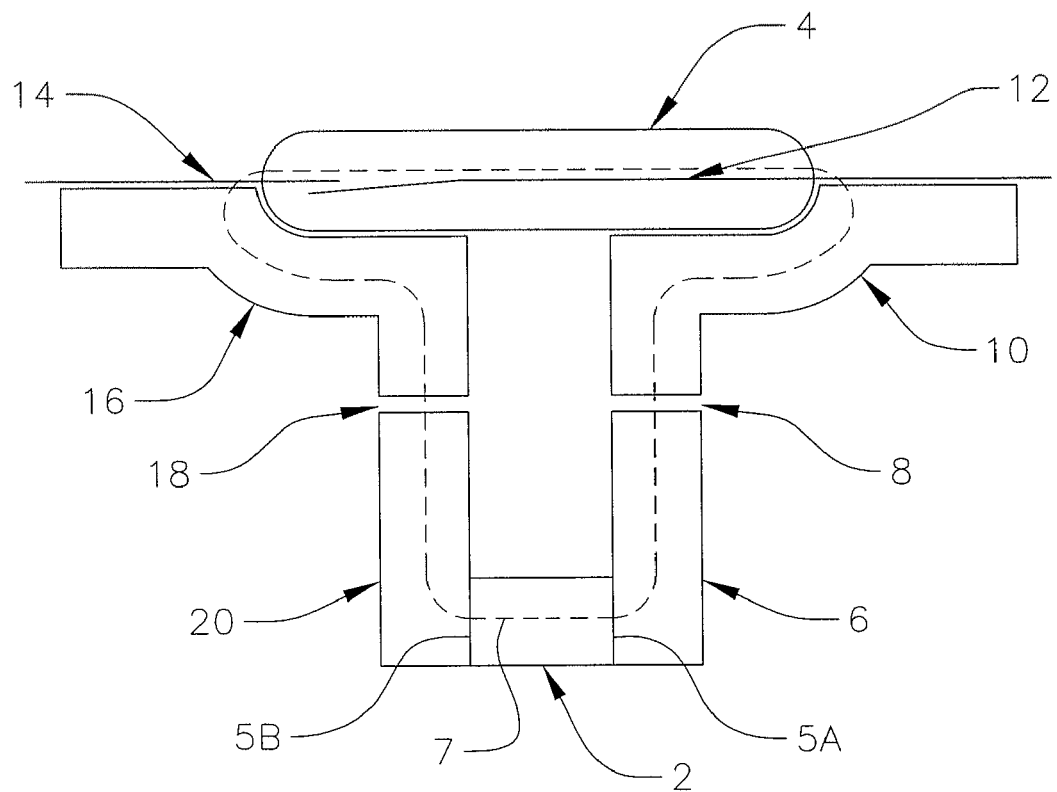
FIG. 2 shows a top view of one embodiment of the present invention.

FIG. 2 shows a top view of one embodiment of a magnetically activated switch according to the present invention using a flux conductor's relative alignment to control the activation of the reed switch 4. Flux (represented in a simplified form by dashed line 7) from pole face 5A of the axially magnetized magnet 2 is conducted through flux conductor 6, across small air gap 8, through flux conductor 10, through the magnetic lead 12 of reed switch 4, through the magnetic lead 14, through flux conductor 16, across small air gap 18, and lastly back through flux conductor 20 to pole face 5B of the magnet 2. The low reluctance of this path with flux conductors 6, 10, 16, and 20 and with relatively small air gaps 8, 18 allows magnet 2 to activate the reed switch 4 even though the magnet is spaced from the reed switch such that in air alone, the magnet would not activate or hold the reed switch 4. The flux conductors 10, 16 are shaped to maximize flux coupling to the reed switch 4 through magnetic leads 12, 14. Although a specific shape of the flux conductors 10, 16 is shown in FIG. 2, the flux conductors may be any shape that allows flux coupling to the reed switch 4.

Figure 3A:
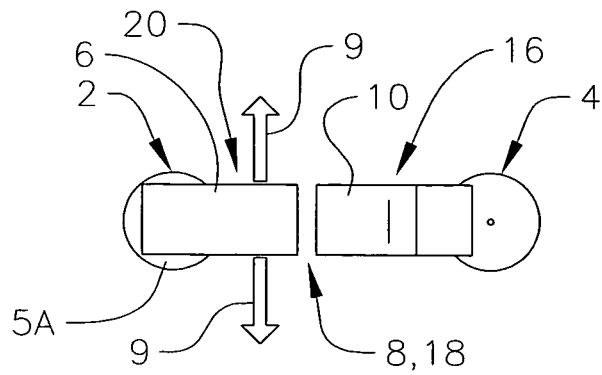
FIG. 3A shows a side view of the embodiment of FIG. 2.
Figure 3B:
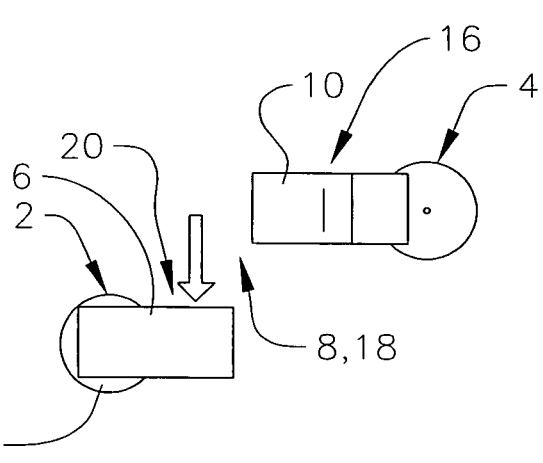
FIG. 3B shows a side view of the embodiment of FIG. 2 after a reed switch has released.

FIGS. 3A and 3B show a side view of the magnetically activated switch of FIG. 2. More specifically, FIG. 3A shows where movement of the magnet 2 and flux conductors 6, 20 indicated by arrows 9 may result in misalignment relative to the flux conductors 10, 16. As represented by the respective arrowed reference number lines, flux conductors 20 and 16 are behind flux conductors 6 and 10, respectively, and are thus not visible in the perspective of FIGS. 3A and 3B. FIG. 3B shows the rapid increase in reluctance due to the increase of the air gaps 8, 18 from the misalignment movement shown in FIG. 3A, causing the reed switch 4 to deactivate the NVG.

Figure 4:
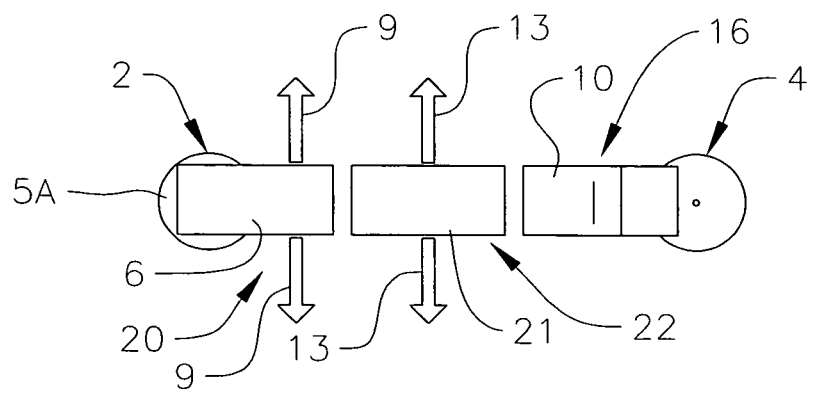
FIG. 4 shows a side view of another embodiment of the present invention.

FIG. 4 shows another embodiment of a magnetically activated switch with the addition of a second set of series flux conductors 21, 22 to form a physical version of the AND function equivalent. As represented by the arrowed line, flux conductor 22 is behind flux conductor 21 and, hence, is not visible in the perspective of FIG. 4. The magnet 2 and flux conductors 6, 20 must be aligned with the second group of flux conductors 21, 22, and the third group of the flux conductors 10, 16 and reed switch 4 for activation. If any of the components are out of alignment (e.g., moved in a direction as indicated by arrows 9 or 13), then reed switch 4 will not activate.

Figure 5:
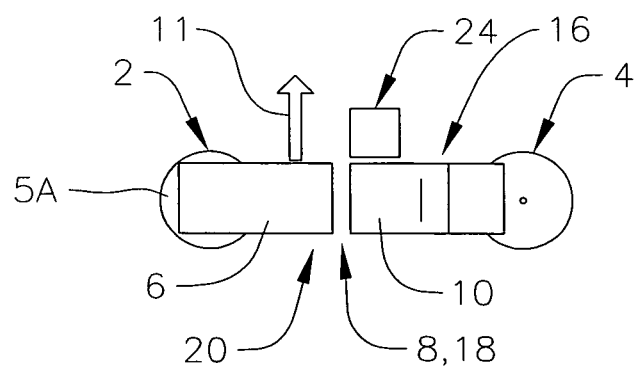
FIG. 5 shows a side view of yet another embodiment of the present invention.

FIG. 5 shows another embodiment of the magnetically activated switch of FIG. 2 including a flux shunt 24 that may be used, for example, to reduce the distance of displacement necessary to cause switching of a reed switch 4. The flux shunt 24 is positioned adjacent to and across flux conductors 10, 16. For example, in the view of FIG. 2 the flux shunt 24 (not shown in FIG. 2) could be positioned above the flux conductors 10, 16 and extending across the gap between the flux conductors 10, 16. With the displacement of the magnet 2 and flux conductors 6, 20 toward the flux shunt 24, the flow of flux switches to the lower reluctance path provided by the flux shunt 24, thereby releasing reed switch 4 with relatively little displacement of the magnet and the flux conductors. That is, once the magnet 4 and flux conductors 6, 20 have been moved up as represented by the arrow 11, the entire or predominant flux flow will now be from pole face 5A, through flux conductor 6, through flux shunt 24, through flux conductor 20, to pole face 5B.

In an alternative embodiment, the flux shunt 24 may be configured to conduct most or all of the flux from the magnet 2 when the flux shunt 24 is in the position shown in FIG. 5. Thus, the switch 4 is deactivated when the flux shunt 24 is in this position. The flux shunt 24 may then be moved away (e.g., in an upward direction in FIG. 5) from the flux conductors 10, 16 to activate the switch 4. Such a configuration also may be implemented using a flux shunt and flux conductors (not shown) coupled in any other way to (e.g., installed on the left hand side of) the magnet 2 in FIG. 5.

Figure 6:
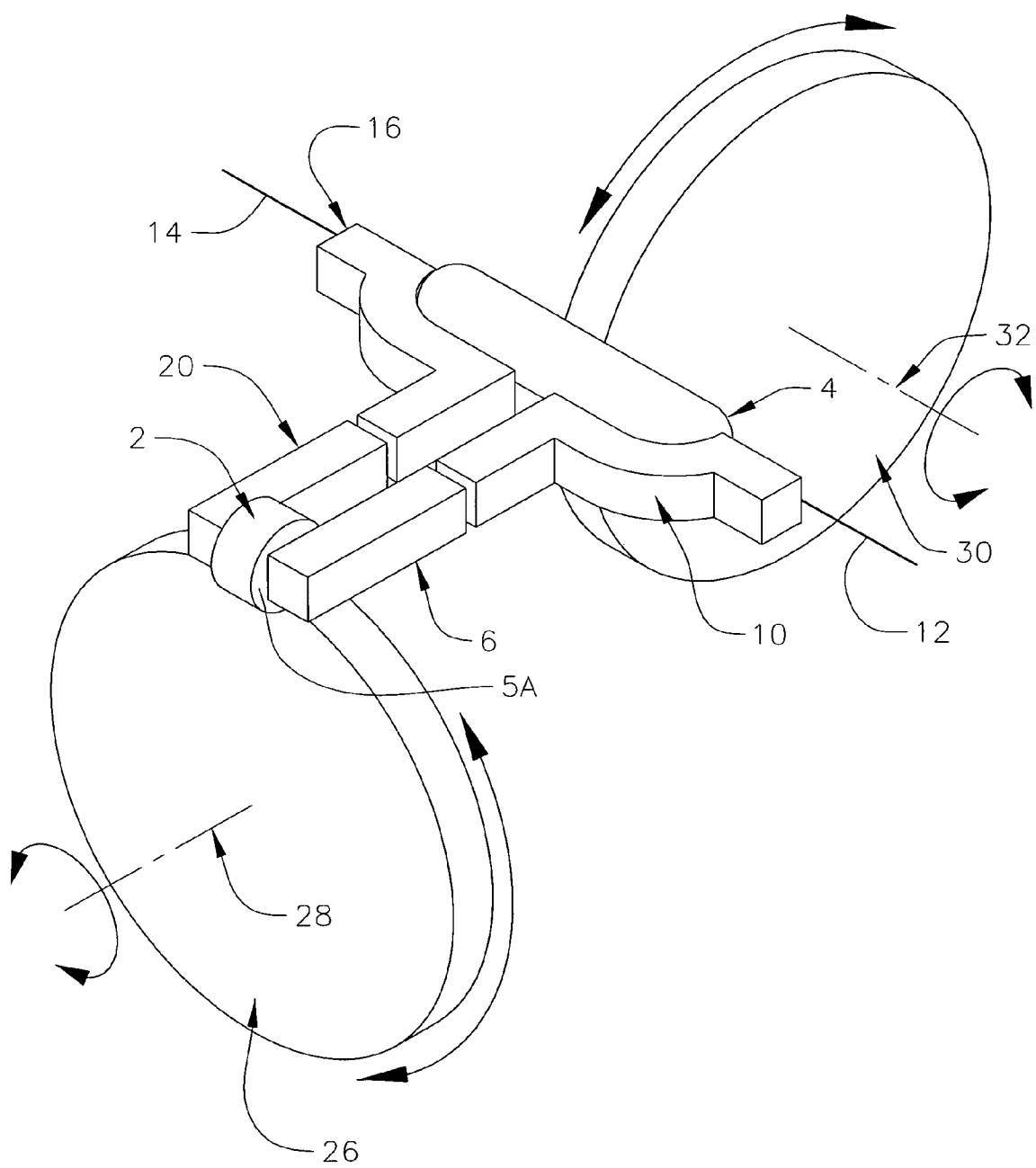
FIG. 6 shows an isometric view of still another embodiment of the present invention.

FIG. 6 shows another embodiment of the magnetically activated switch of FIG. 2 with the addition of rotational platforms 26, 30 to make the reed switch 4 sensitive to rotational movement. The magnet 2 and flux conductors 6, 20 are attached to platform 26 that rotates about axis 28. The reed switch 4 and flux conductors 10, 16 are attached to platform 30 that rotates about axis 32. The addition of the rotational platforms 26, 30 makes the sensor sensitive to the rotation angle of the two orthogonal axes.

Figure 7:
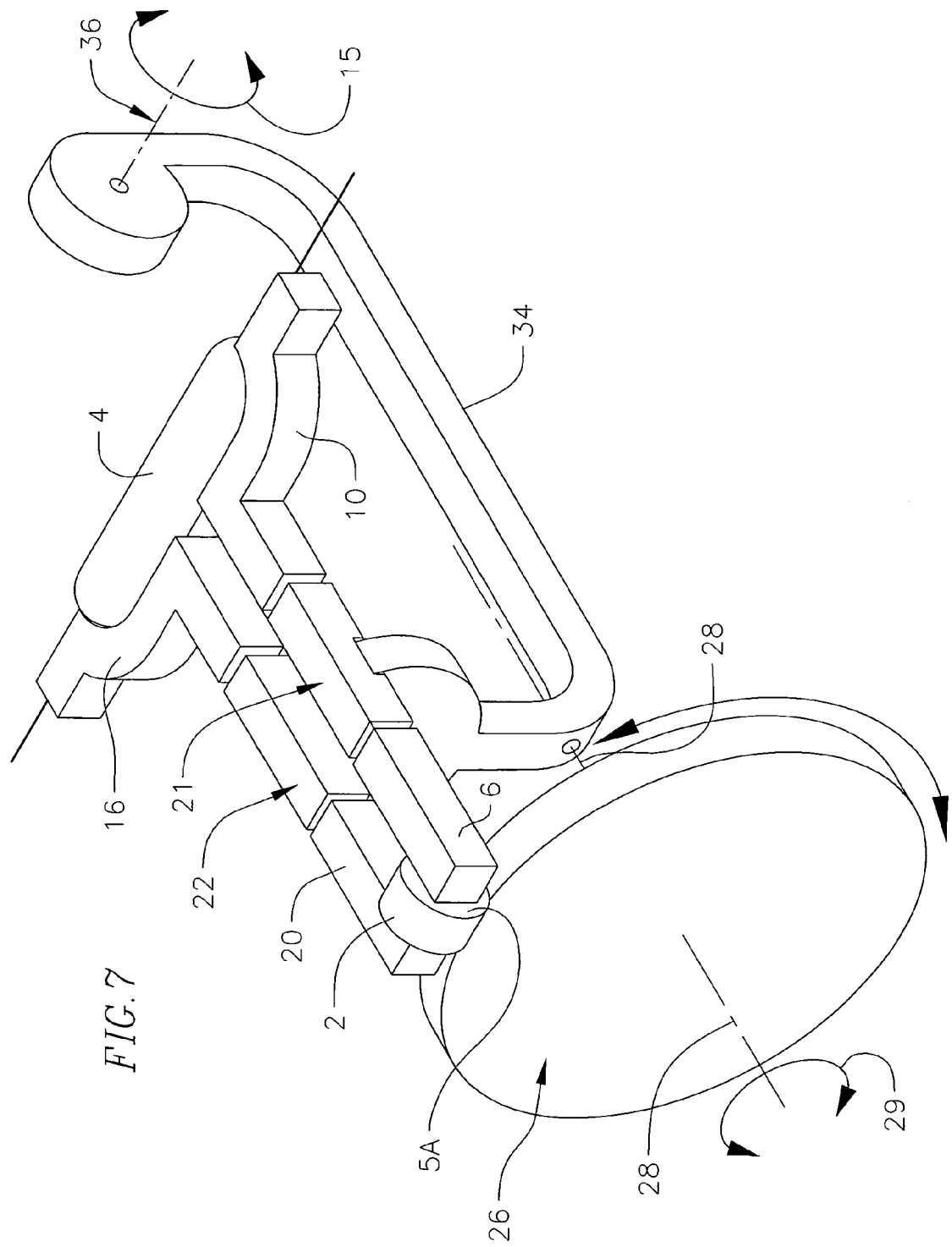
FIG. 7 shows an isometric view of another embodiment of the present invention.

FIG. 7 shows a conceptual drawing of another embodiment of the magnetically activated switch of FIG. 4 with the addition of rotational elements to make the switch sensitive to rotational movements. This embodiment incorporates elements that are useful for a helmet mounted scope application. The magnet 2 and flux conductors 6, 20 are mounted to platform 26 revolving about axis 28 that is attached to another platform 34. Platform 34 supports flux conductors 21, 22 and rotates about axis 36. Sensor reed switch 4 and flux conductors 10, 16 are shown in the activated position. Rotation of platform 26 or platform 34 (e.g., as represented by arrow 29 and arrow 15, respectively) will deactivate the reed switch, resulting in deactivation of the NVG (not shown).

As mentioned above, logical operations may be performed in conjunction with the reed switch by controlling the position of one or more components associated with the magnetically activated switch. For example, one or more of the magnet, the flux conductors, the reed switch or other components may be moved to control the output of the magnetically activated switch. FIG. 4 illustrates an example where the assembly of the magnet 4 and flux conductors 6, 20 AND the assembly of the flux conductors 21, 22 must be at proper positions to activate the switch 4 (an AND function). In other words, if either assembly is not in the proper position, the switch 4 will not be activated. FIG. 6 illustrates an example where the assembly 26 AND the assembly 30 must be rotated to proper positions to activate the switch 4 (an AND function). FIG. 7 illustrates an example where the assembly 26 AND the assembly 34 must be rotated to proper positions to activate the switch 4 (an AND function).

Figure 8:
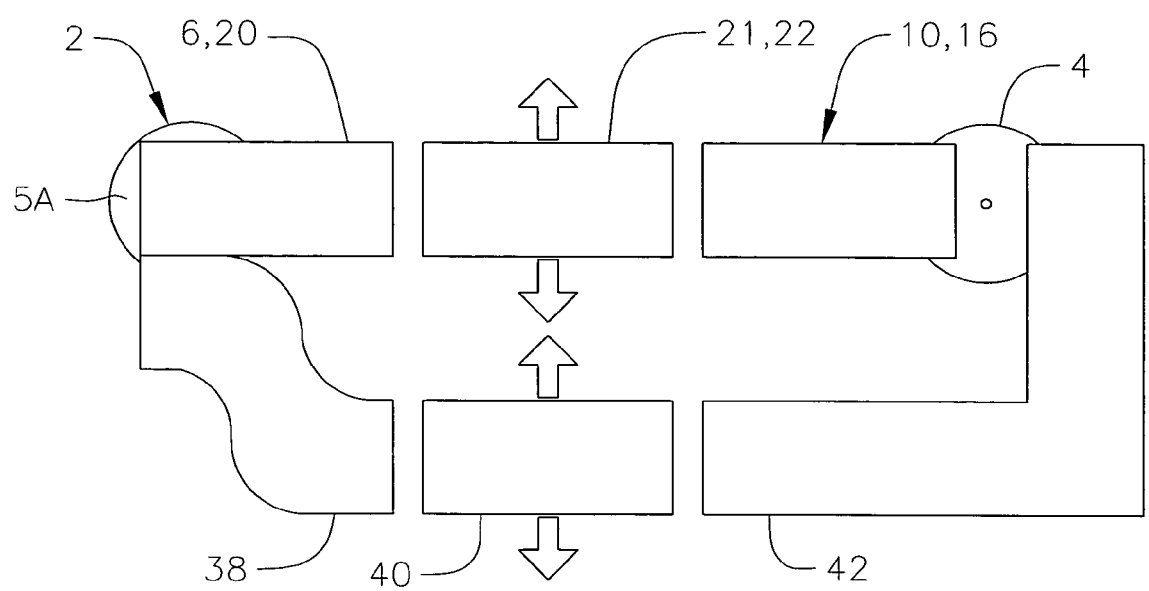
FIG. 8 shows a side view of yet another embodiment of the present invention.

FIG. 8 show another embodiment of a magnetically activated switch that adds a second flux path to implement a logical OR sensor. Additional flux conductors 38, 40, 42 provide an additional path to the reed switch 4. Not shown are the return path elements. In this configuration, when either flux conductor 6, 21 and 10 (and associated flux conductors 20, 22 and 16, not visible in this perspective) are in alignment, OR when flux conductors 38, 40 and 42 (and associated flux conductors not visible in this perspective) are in alignment, the reed switch 4 will activate.

It should be appreciated that actuation of the switch may result in different types of output signals depending on the configuration of the switch. For example, a switch may be a single pole, single throw switch; a single pole, double throw switch; or some other type of switch. For a reed switch, actuation of the switch generally refers to causing the switch contact or contacts to move from a normal position (e.g., open or closed) in the absence of magnetic flux to another position (e.g., closed or open) upon application of a sufficient amount of magnetic flux. Accordingly, activation of a switch may result in contact moving from a closed position to an open position and/or from an open position to a closed position. Accordingly, the output of the switch may be configured to, in effect, provide a normal output signal or an inverted output signal (e.g., a NOT function).

It also should be appreciated that a given logic function may be provided by an equivalent inverse function. For example, in relation to FIG. 4 the output of the switch 4 may be defined as an OR function whereby placing either the assembly of the magnet 2 and flux conductors 6, 20 OR the assembly of the flux conductors 21, 22 in a non-active position causes the switch to deactivate. The output of the switch may in this case, for example, turn off a device (e.g. NVG) when either assembly is in a non-active position. Referring to FIG. 8, the output of the switch may be defined as an AND function whereby placing both flux conductors 20, 21 and 10 out of alignment AND placing flux conductors 38, 40 and 42 out of alignment causes the switch to deactivate. The output of the switch may in this case, for example, turn off a device (e.g. NVG) when both sets of flux conductors are in a non-aligned position.

Figure 9A:
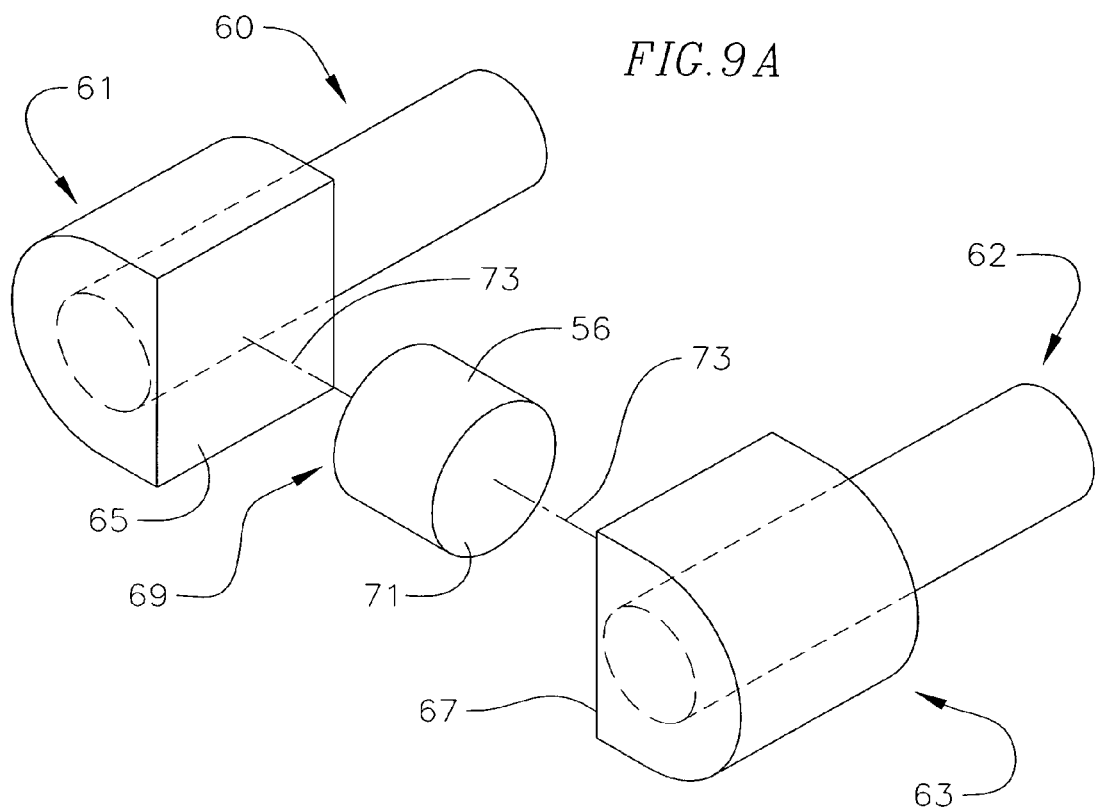
FIGS. 9A-9E, shows several simplified views of one embodiment of the present invention.
Figure 9B:
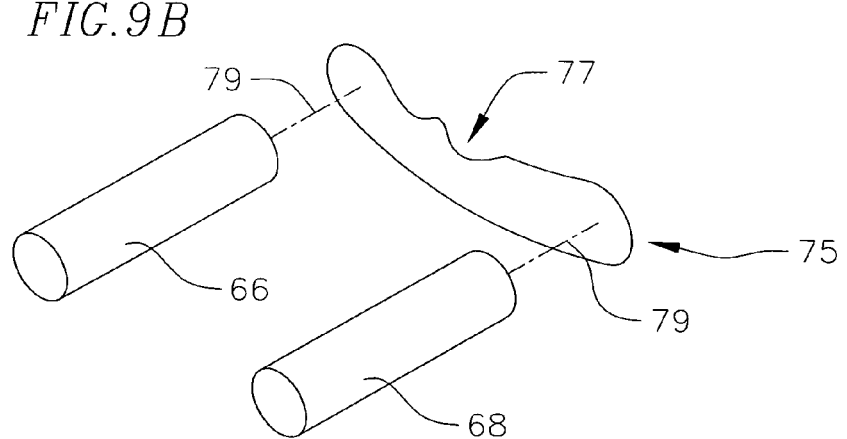
Figure 9C:
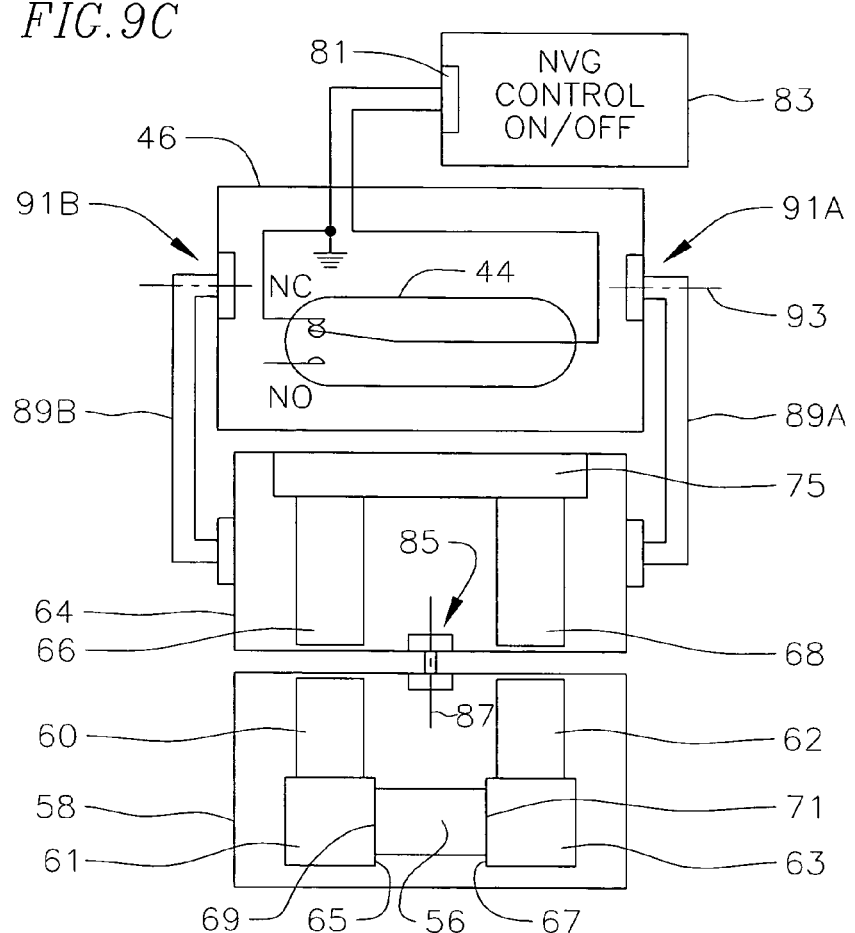

FIGS. 9A-9E illustrates in a simplified form one embodiment of a magnetically activated switch that may be incorporated into a helmet mount for NVG. FIG. 9A illustrates a pair of flux conductors 62, 60 and a magnet 56 (e.g., corresponding to flux conductors 6, 20 and magnet 2 discussed above) that are provided in a first assembly 58 upon which NVG (not shown) may be mounted (See FIG. 9C). Each flux conductor 60, 62 includes an enlarged end portion 61, 63 that has a flat portion 65, 67 for more effectively coupling with pole faces 69, 71, respectively, of the magnet 56. As represented by the dashed lines 73 and as shown in FIG. 9C, when the components of FIG. 9A are assembled the flat portions 65, 67 will contact the pole faces 69, 71.

FIG. 9B illustrates a pair of flux conductors 68, 66 (e.g., corresponding to flux conductors 21, 22 discussed above) that are provided in a second assembly 64 (See FIG. 9C). The assembly includes another flux conductor 75 that serves to redirect at least a portion of the flux flowing through the flux conductors 66, 68. The flux conductor 75 may be used, for example, to reduce the amount of flux that may otherwise be imparted on a switch 44 (e.g., corresponding to switch 4 discussed above) when the second assembly 64 is in a non-actuating position (See FIG. 9E). The flux conductor 75 may be designed with a given shape and attributes depending on how and how much flux is to be diverted through the flux conductor 75. For example, the flux conductor 75 may include a notch 77 to alter the direction of and/or reduce the amount of stray flux emanated from the flux conductor 75. As represented by the dashed lines 79 and as shown in FIG. 9C, when the components of FIG. 9B are assembled one end of each flux conductor 66, 68 will contact a face of the flux conductor 75.

FIG. 9C illustrates in a simplified cut-away, top view how the assemblies 58 and 64 may interface with one another and with an assembly 46 including a switch 44. The assembly 58 attaches to the assembly 64 via a rotating mount 85. Thus, the assembly 58 may rotate relative to the assembly 64 along an axis 87. The assembly 64 attaches to the assembly 46 via arms 89A, 89B that attach to rotating mounts 91A, 91B. Here, the assembly 64 (and, hence, assembly 58) may rotate relative to the assembly 46 along an axis 93.

In this example, the switch 44 is a SPDT switch that provides a ground signal via a normally closed ("NC") contact to an ON/OFF control input 81 of a NVG control unit 83 when the switch 44 is not activated. In response to this signal, the control unit 83 may turn the NVG off. When the switch 44 is activated, the switch 44 switches to the normally open ("NO") contact position. This, in turn, results in the input 81 being forced to a high level (e.g., VCC) by a pull-up resistor on the corresponding lead or by a signal (not shown) that drives the NO contact to a high level. The control unit 83 may thus turn the NVG on.

The configuration of FIG. 9C is similar to the configuration described above in conjunction with FIG. 7. Thus, the NVG may be turned off when either the assembly 64 is rotated about the axis 93 (e.g., rotated up) or when the assembly 58 is rotated about the axis 87. These aspects of the embodiment of FIG. 9C are further illustrated in FIGS. 9D and 9E.

Figure 9D:
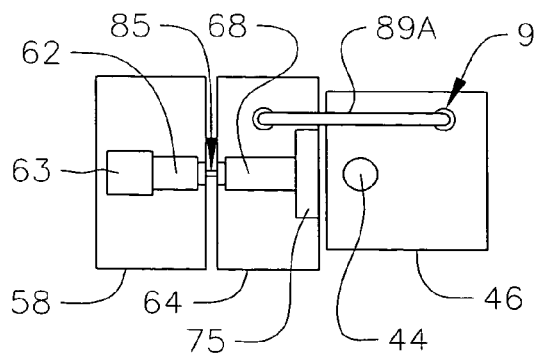

FIG. 9D illustrates a simplified cut-away, side view of the orientation of FIG. 9C. Note that flux conductors 60 and 62 and the magnet 56 are not visible in the side view of FIG. 9D. Here, the flux conductors are aligned to activate the switch 44. That is, the assembly 58 is rotated to a position where the flux conductors 62, 60 are aligned with the flux conductors 68, 66, respectively. In addition, the assembly 64 is rotated to a position where ends of the flux conductors 68, 66 are close to the switch 44. In this orientation, the NVG is turned on.

Figure 9E:
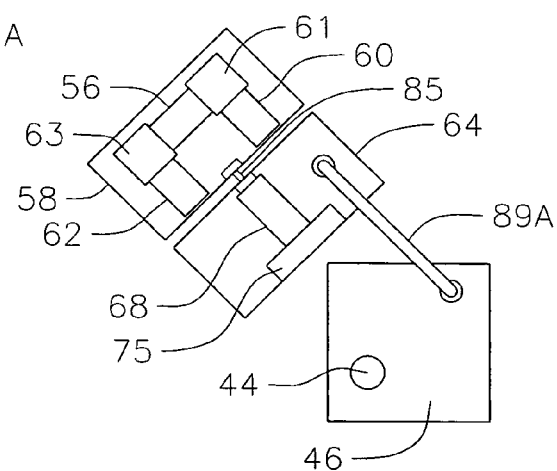

FIG. 9E illustrates a simplified cut-away, side view of an orientation where the flux conductors are not aligned such that the switch 44 is not activated. For example, the assembly 58 is rotated so that the flux conductors 62, 60 are not aligned with the flux conductors 68, 66, respectively. In addition, assembly 64 is rotated so that the ends of the flux conductors 68, 66 are not close to the switch 44. As discussed above, either of these conditions would be sufficient to deactivate the switch and, hence, turn off the NVG. The flux conductor 66 is not visible in the side view of FIG. 9E.

The conceptual embodiments shown should not be limited to the described configurations, but rather as examples of the flexibility of using flux conductors to construct physical position sensing mechanisms. For instance, instead of a reed switch, the magnetic sensor described herein could be a Hall Effect device, flux gate, GMR, or other magnetically sensitive detector. The flux conductors are generally shown as straight devices, but could also be formed in complex paths while presenting low reluctance to the magnetic flux. The flux paths are generally shown as equal in length, but this is not necessary. Additional paths or additional series elements could be added to form more complex logical structures. In addition, other methods may be used to interrupt or redirect the flow of flux between a magnet and a switch. For example, one or more flux shunts may be configurable to selectively redirect flux flow. Here, the flux shunt may be selectively positioned across flux conductors coupled with the pole faces of the magnet. Alternatively, a device that interrupts flux flow (e.g., made of or including a material with relatively high reluctance, e.g., aluminum, air, etc.) may be selectively positioned in the normal flux path between the magnet and the switch. Furthermore, a variety of materials may be used to construct the flux conductors or other components. For example, a flux conductor may comprise a material having relatively high magnetic permeability (e.g., a magnetic metal such as iron, ferrite, soft steel, etc.) and may include other material such as plating made of nickel or some other material. Also, all of the structural members described herein that may affect the flow of flux (flux conductors, flux shunts, high reluctance members, etc) may be mounted in a variety of ways to accomplish the desired positioning of the members. In addition, other structural members (e.g., as illustrated in FIGS. 10-15) may be incorporated for the purpose of supporting and/or repositioning other members.

FIGS. 10 through 15 depict specific embodiments of the magnetic switch concept described above as applied to a specific helmet mount for a NVG. The following descriptions of specific embodiments are not meant to limit the invention as disclosed herein, but are used merely to provide examples.

Figure 10:
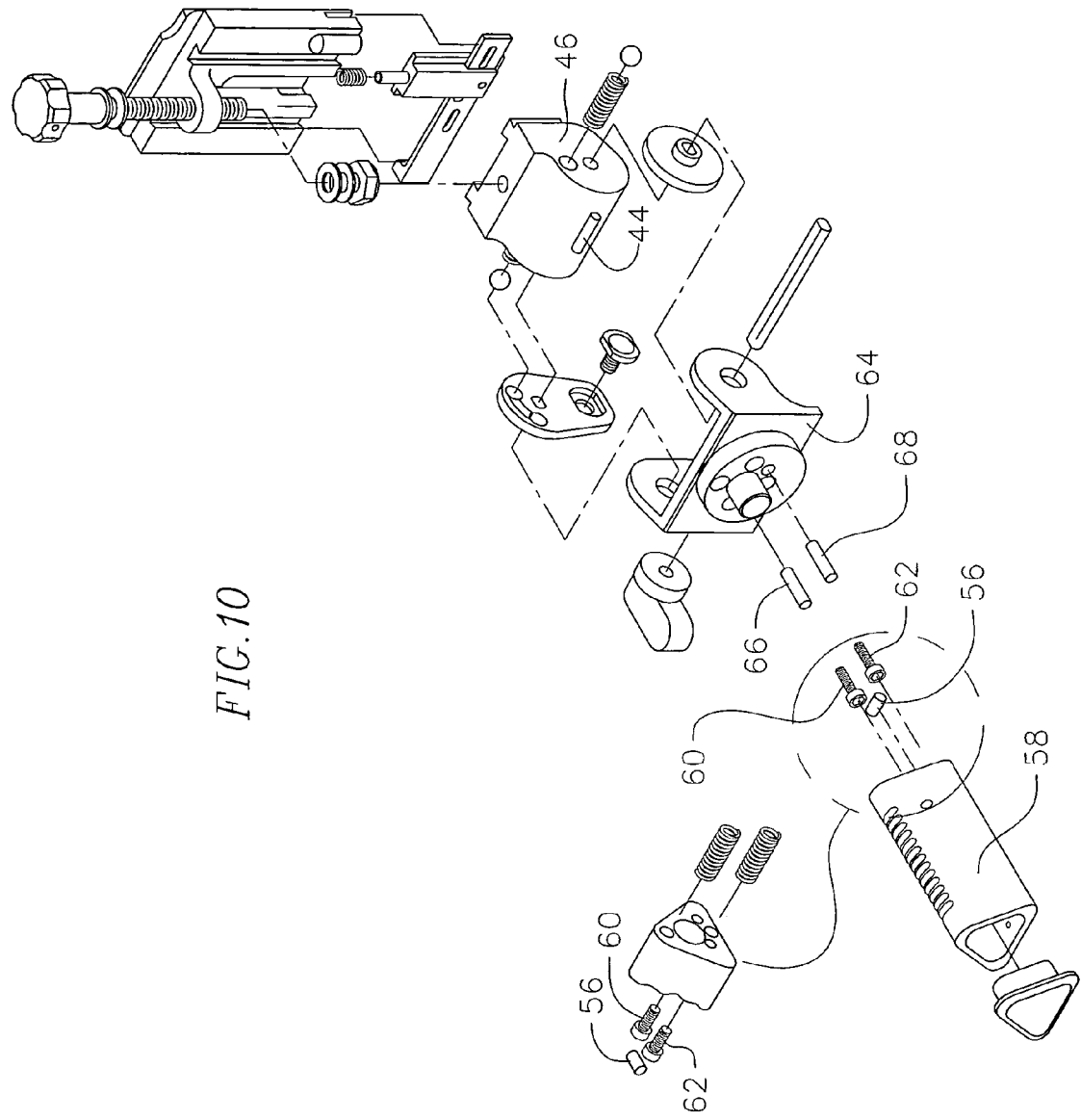
FIG. 10 shows an exploded view of yet another embodiment of the present invention integrated into a helmet mount for a night vision goggle.
Figure 11:
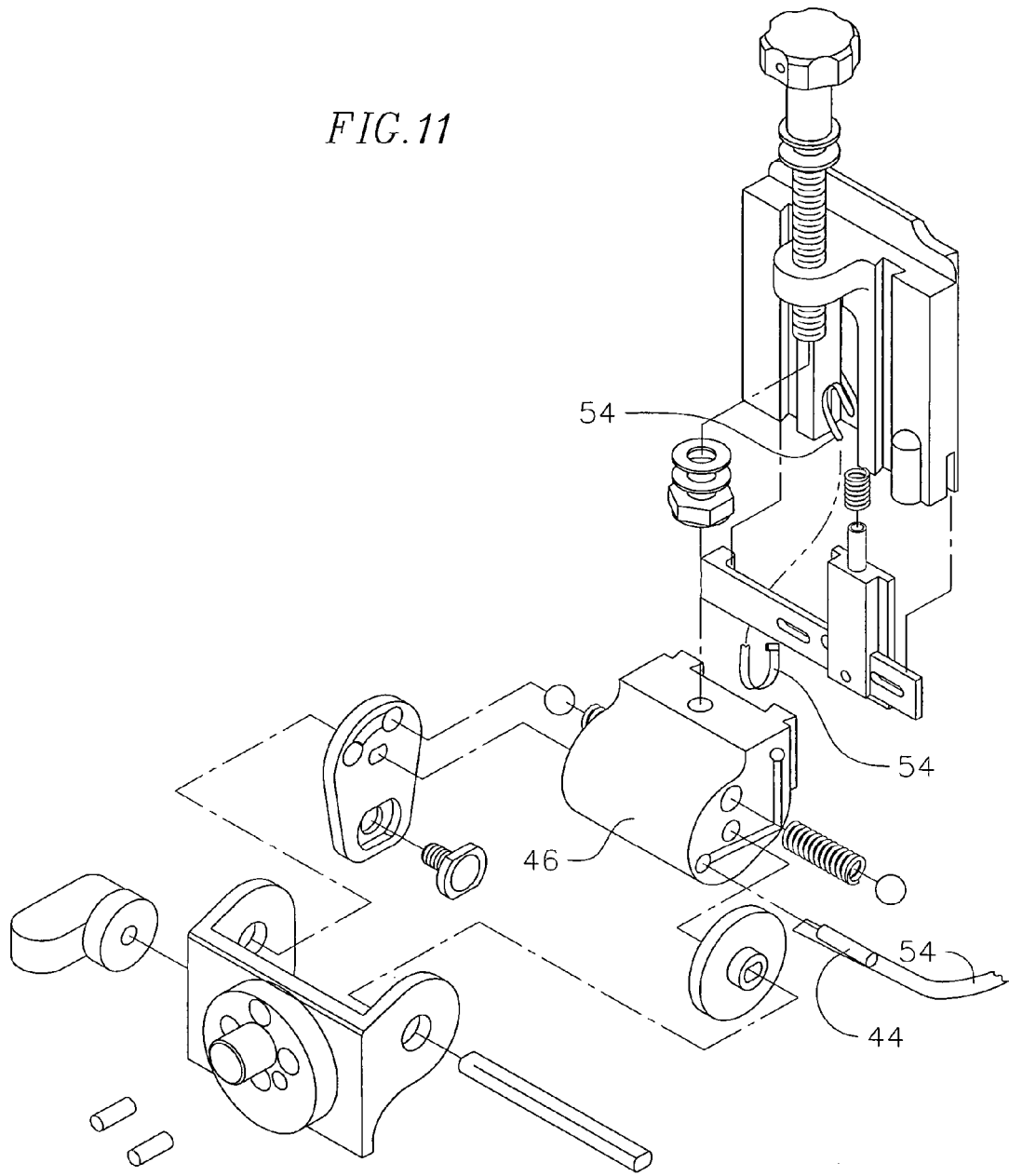
FIG. 11 shows a partial isometric view of the embodiment of FIG. 10.
Figure 12:
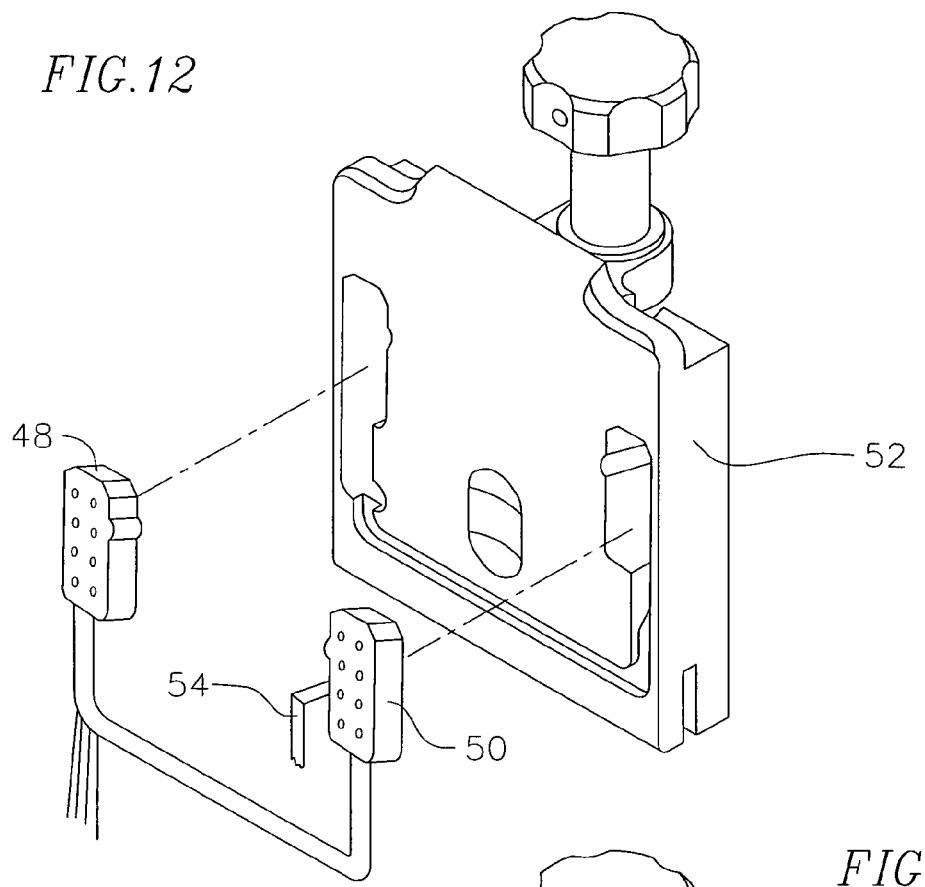
FIG. 12 shows a partial isometric view of the embodiment of FIG. 10.
Figure 13:
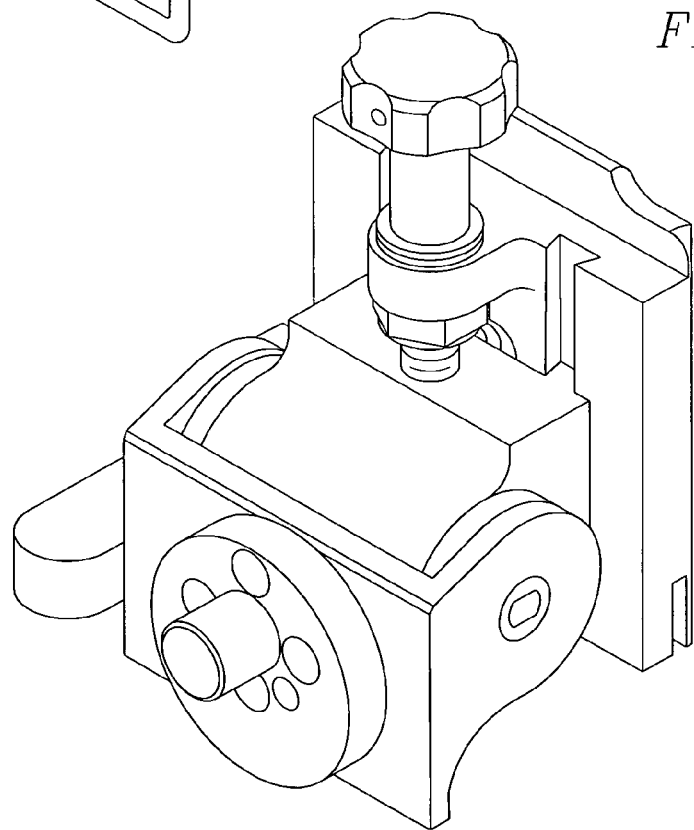
FIG. 13 shows a partial isometric view of the embodiment of FIG. 10.

FIG. 10 shows one embodiment of a simple configuration for a switch assembly. The magnetically operated switch 44, such as a reed switch, in the circuit that controls the activation of the NVG carried on the mount is positioned in a vertical block 46 of the mount. FIGS. 11 through 13 show additional aspects of the circuit containing the switch 44. Receptacles 48, 50 adapted to be connected to a power source on the helmet are mounted in the back of housing 52 (see FIG. 12). The back of housing 52 faces toward the helmet when placed on a helmet. An electrical conduit 54 travels from the receptacles in the housing 52 into the vertical block 46 containing the switch 44 (FIG. 10). The conduit has some slack along its length as it moves down the housing to accommodate vertical adjustment of the vertical block 46 relative to the housing 52.

Referring again to FIG. 10, a magnet 56 is mounted in a tri monorail 58 from which the NVG (not shown) is suspended. A pair of flux conductors 60, 62 are also mounted in the tri monorail 58. One end of each flux conductor 60, 62 is positioned at opposite poles of the magnet 56. The other end of the flux conductors 60, 62 are positioned at an end of the tri monorail 58 where the tri monorail is rotatably attached to a chassis 64. The chassis 64 in turn is pivotally connected to the vertical block 46. A pair of flux conductors 66, 68 are mounted extending through the chassis 64. In the in-use position, as shown in FIG. 10, one end of the flux conductors 66, 68 are adjacent and aligned with an end of the flux conductors 60, 62. The other end of the flux conductors 66, 68 are adjacent and aligned with the opposite ends of the switch 44. Thus, in the use position, the flux conductors are arranged so that the magnetic flux is conducted to the switch 44, allowing the switch 44 to be activated, turning the NVG on.

If the tri monorail 58 is rotated 90° about its longitudinal axis to move the NVG to a quick stowage position, flux conductors 60, 62 will no longer be aligned with flux conductors 66, 68, causing the switch to open and turning the NVG off. Also, if the chassis 64 is flipped up relative to the vertical block 46 to move the NVG to a flip-up stowage position, flux conductors 66, 68 will pivot up and away from the switch 44, causing the switch 44 to open and the NVG to be turned off.

Figure 14:
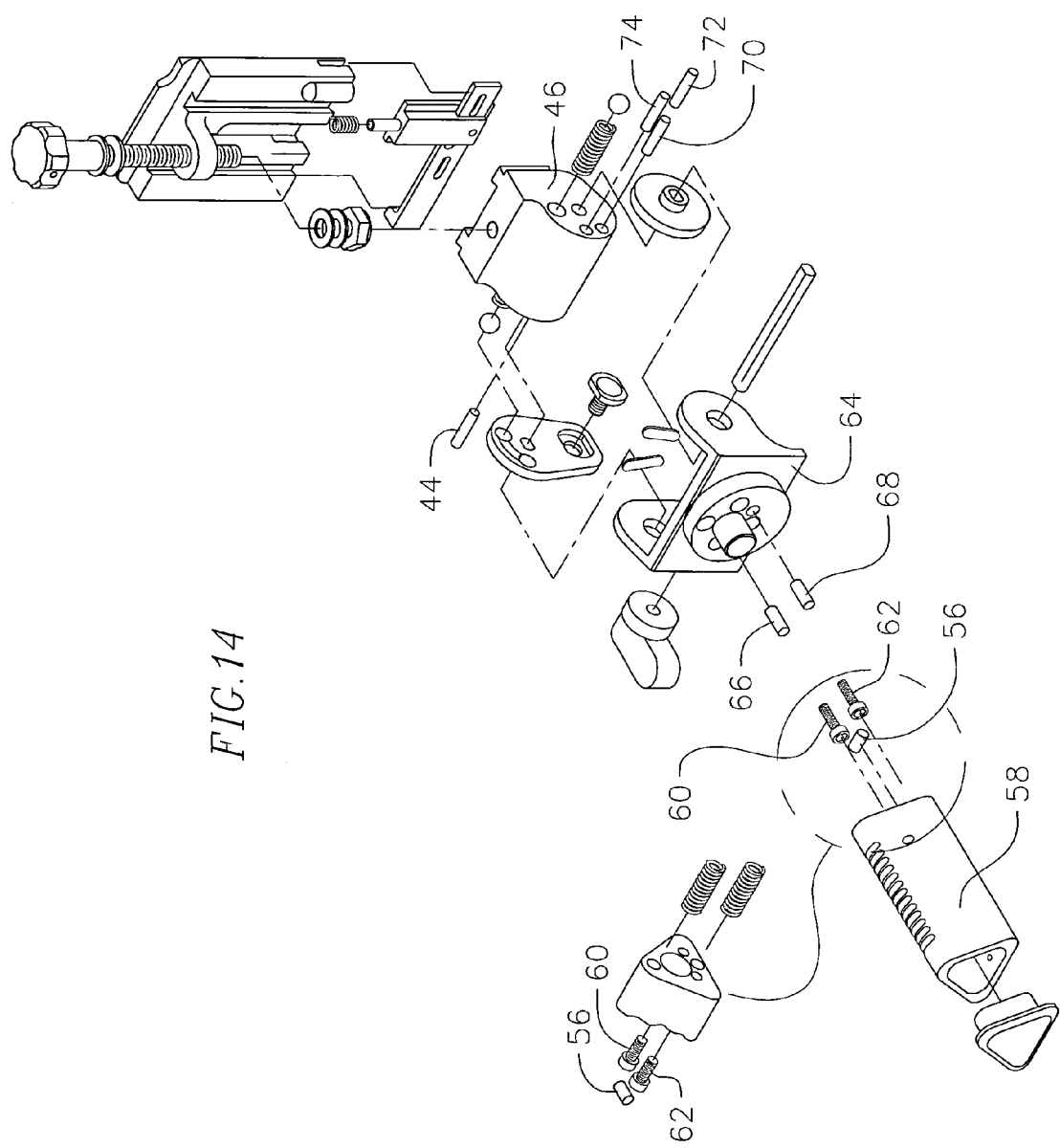
FIG. 14 shows an exploded view of another embodiment of the present invention integrated into a helmet mount for a night vision goggle.

FIG. 14 shows an assembly similar to the assembly of FIG. 10. For conciseness, only the differences will be described in detail and like parts have been assigned the same reference numerals as the embodiment of FIG. 10. In the embodiment of FIG. 14, two flux conductors 70, 72 are mounted in the vertical block 46. The flux conductors 70, 72 are positioned in front of and aligned in the same direction as the switch 44. Thus, these additional conductors strengthen the connection between flux conductors 66, 68 in the chassis 64 and the switch 44 in the vertical block 46, when flux conductors 66, 68 are positioned in the use position.

The embodiment of FIG. 14 also includes a shunt 74 mounted in the vertical block 46 and positioned above and away from the switch 44. The shunt 74 provides a quicker disconnection of the magnetic flux from the switch 44 when the chassis 64 is pivoted upward. That is, as chassis 64 is pivoted upward, flux conductors 66, 68 also pivot upward along the outer front surface of the vertical block 46. When the ends of the flux conductors 66, 68 are aligned with the shunt 74, the switch 44 opens and the NVG turns off.

Figure 15:
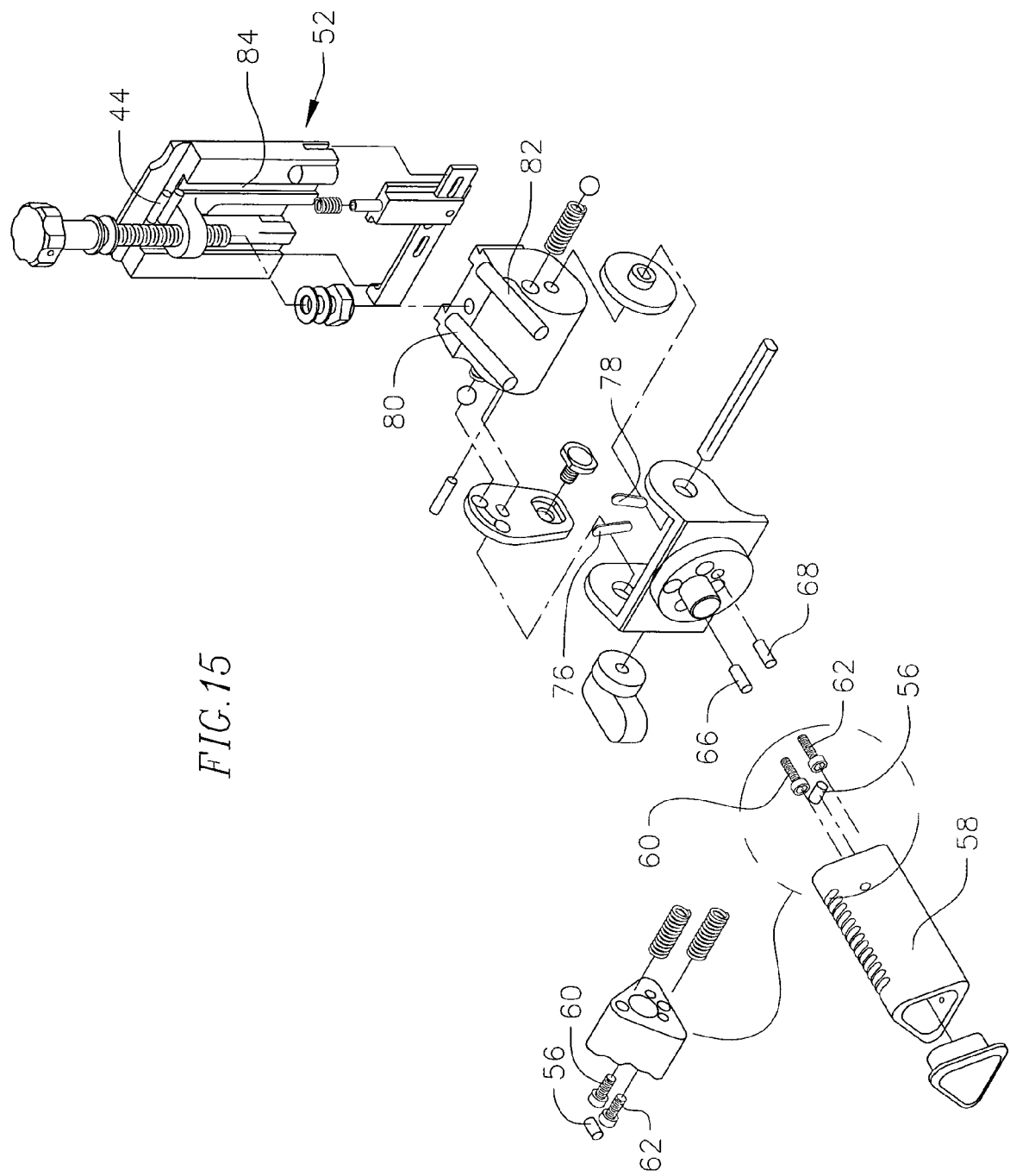
FIG. 15 shows an exploded view of one embodiment of the present invention integrated into a helmet mount for a night vision goggle.

FIG. 15 shows an embodiment for a switch assembly where a switch 44 is positioned at the top of the housing 52. Positioning the switch 44 at the top of the housing 52 avoids the need for a conduit running down the housing 52. The magnet 56 and the flux conductors 60, 62, 66, 68 are positioned and operate in much the same manner as in the previous embodiments. These components have been assigned the same reference numbers as the previous embodiments. However, due to the position of the switch 44, additional flux conductors are needed. A pair of flux conductors 76, 78 extend upward along the back surface of the chassis. Another pair of flux conductors 80, 82 extend through the top of the vertical block 46. Finally, an inverted U-shaped flux conductor 84 has legs extending up the front surface of the housing 52 and a cross bar extending across the top of the housing 52 near the switch 44.

The configuration of the flux conductors in the embodiment of FIG. 15 provides an unbroken conductive path when the NVG are in an in-use position. However, as with the other embodiments, movement of the mount to a stowage position for the NVG breaks the path and opens the switch to turn off the NVG.

The foregoing description of the preferred embodiments of the invention have been presented for the purposes of illustration and description. The description is not intended to be exhaustive or to limit the invention to the precise form disclosed. Many modifications and variations are possible in light of the above teaching. The scope of the invention is not limited by this description, but by the claims and the equivalents to the claims appended hereto.

What is claimed is:

1. An apparatus for sensing relative positions of mechanically coupled devices comprising:

a magnetically activated switch including a first switch end and second switch end, the first switch end being electrically connected to an incoming electrical lead and the second switch end being electrically connected to an outgoing electrical lead, the magnetically activated switch being adapted to control a flow of current through the leads depending on whether a sufficient flux is flowing through the magnetically activated switch;

a first switch end flux conductor positioned adjacent to the first switch end;

a second switch end flux conductor positioned adjacent to the second switch end;

a permanent magnet including a first magnetic end and a second magnetic end;

a first magnetic end flux conductor positioned adjacent to the first magnetic end; and a second magnetic end flux conductor positioned adjacent to the second magnetic end, the first magnetic end flux conductor being separated from the first switch end flux conductor by a first gap and the second magnetic end flux conductor being separated from the second switch end flux conductor by a second gap such that when reluctance associated with the first and second gaps is low, a flux flows in a series path from the first magnetic end to the second magnetic end, the flux flows from the first magnetic end through the first magnetic end flux conductor and the first switch end flux conductor, through the magnetically activated switch, and through the second switch end flux conductor and the second magnetic end flux conductor to the second magnetic end.

2. The apparatus of claim 1, wherein the magnetically activated switch is adapted to couple the first switch end and the second switch end when said sufficient flux is flowing through the magnetically activated switch, and is adapted to decouple the first switch end and the second switch end when said sufficient flux is not flowing through the magnetically activated switch.

3. The apparatus of claim 1, wherein the magnetically activated switch is adapted to couple the first switch end and the second switch end when said sufficient flux is not flowing through the magnetically activated switch, and is adapted to decouple the first switch end and the second switch end when said sufficient flux is flowing through the magnetically activated switch.

4. The apparatus of claim 1, wherein the permanent magnet is mounted at a non-actuating distance from the magnetically activated switch.

5. The apparatus of claim 1, comprising a flux shunt repositionable to redirect flux flow from the permanent magnet to reduce or terminate flux flow through the magnetically activated switch.

6. The apparatus of claim 1, wherein the permanent magnet, first magnetic end flux conductor and second magnetic end flux conductor are connected into a magnet assembly adapted to allow movement of the magnet assembly to increase and to decrease the first gap and the second gap.

7. The apparatus of claim 6, further including a flux shunt positioned such that the magnet assembly may move closer to the flux shunt and away from the first switch end flux conductor and the second switch end flux conductor thereby diverting flux flow to the magnetically activated switch.

8. The apparatus of claim 7, wherein the apparatus is integrated into a helmet mount for night vision goggles such that the apparatus may sense the relative position of the helmet mount and thereby control the operation of the night vision goggles.

9. The apparatus of claim 1, further including an additional pair of flux conductors positioned within the first gap and the second gap, the additional pair of flux conductors being positioned adjacent to the first magnetic end flux conductor and the second magnetic end flux conductor and being positioned adjacent to the first switch end flux conductor and the second switch end flux conductor thereby implementing the logical AND function in accordance with certain physical alignments.

10. The apparatus of claim 1, further including a further set of flux conductors affixed to the permanent magnet and magnetically activated switch separated by a further set of air gaps, thereby implementing the logical OR function of certain physical alignments by addition of other additional flux paths to conduct flux from the permanent magnet to the magnetically activated switch.

11. A method for sensing relative positions of mechanically coupled devices using a magnetically actuated switch, the method comprising:

locating a magnet at a distance from a magnetically actuated switch, the magnet including a first magnet end and a second magnet end; and mounting a plurality of magnetic flux conductors in series between the magnet and the magnetically actuated switch, the plurality of magnetic flux conductors including a first set of flux conductors for forming a first series path and a second set of flux conductors for forming a second series path, the first series path for allowing a flux to flow from the first magnet end to the magnetically actuated switch, the second series path for allowing said flux to return from the magnetically actuated switch to the second magnet end in a single series path from the first magnet end through the first set of flux conductors, through the magnetically actuated switch, and through the second set of flux conductors to the second magnet end;

wherein the magnetic flux conductors are mounted to coupled devices to reflect positions of the coupled devices so as to allow the coupled devices to change their relative position; and wherein changing the relative positions of the coupled devices changes a flow of said flux from the first magnet end through the first series path to the magnetically actuated switch and through the second series path to the second magnet end.

12. The method of claim 11, further including providing gaps between the flux conductors, the gaps being capable of conducting flux from the magnet to the magnetically actuated switch in certain positions and being incapable of conducting flux in other positions.

13. The method of claim 12, further including placing a flux shunt in position to shunt flux flow from the magnet to the magnetically actuated switch when the mechanically coupled devices are in certain relative positions.

14. The method of claim 13, further including additional flux conductors to implement the logical AND function of certain physical alignments when the flux conductors are aligned to conduct flux flow from the magnet to the magnetically actuated switch.

15. The method of claim 13, further using additional flux conductors to implement the logical OR function by adding other additional flux paths to conduct flux flow from the magnet to the magnetically actuated switch.

16. An apparatus for sensing position comprising:

a magnet assembly for generating a magnetic field, the magnet assembly including:

a magnet having a first pole and a second pole;

a first flux conductor adjacent the first pole;
a second flux conductor adjacent the second pole;
a switch assembly, the switch assembly being operable in the presence of a magnetic field, the switch assembly including:
 a third flux conductor adjacent the switch assembly and positioned in series with the first flux conductor at a first predetermined location;
 a fourth flux conductor adjacent the switch assembly and positioned in series with the second flux conductor at a second predetermined location;
a first gap disposed between the first and third flux conductors;
a second gap disposed between the second and fourth flux conductors;
wherein the first flux conductor and the third flux conductor form a first path for a flux to flow from the magnet to the switch assembly, and the second flux conductor and the fourth flux conductor form a second path for said flux to return to the magnet; and
wherein one of the magnet assembly and the switch assembly is movable with respect to the other so that the switch assembly operates if and only if the flux conductors are aligned in series such that the first path and the second path are aligned in a single series.

17. The apparatus of claim 16 wherein the first gap and the second gap are air gaps.

18. The apparatus of claim 16 wherein the first and second flux conductors comprise a high permeability material.

19. The apparatus of claim 16 wherein the third and fourth flux conductors comprise a high permeability material.

20. The apparatus of claim 16 further comprising a flux shunt positioned to be aligned with the third flux conductor and the fourth flux conductor at a predetermined location, wherein the flux shunt diverts the magnetic field to disable the switch.

21. The apparatus of claim 20 wherein the flux shunt comprises a high permeability material.

22. The apparatus of claim 16 further comprising a fifth flux conductor in series with the first flux conductor and the third flux conductor and a sixth flux conductor in series with the second flux conductor and the fourth flux conductor.

23. The apparatus of claim 22 further comprising a third gap between the first flux conductor and the third flux conductor and a fourth gap between the second flux conductor and the fourth flux conductor.

24. an apparatus according claim 1, further comprising:
a plurality of movable members mounted to be repositionable to control actuation of the magnetically actuated switch.

25. The apparatus of claim 24, wherein the plurality of movable members comprise a first set of movable members and a second set of movable members for forming a single series path between the magnet and the magnetically actuated switch, and
 the magnetically actuated switch is actuated if and only if both the first set of movable members and the second set of movable members are aligned in series between the magnet and the magnetically actuated switch.

26. The apparatus of claim 24, wherein the plurality of movable members comprise a first set of movable members and a second set of movable members for forming dual series paths between the magnet and the magnetically actuated switch, and
 the magnetically actuated switch is actuated if either the first set of movable members or the second set of movable members is aligned in series between the magnet and the magnetically actuated switch.

27. The apparatus of claim 24, wherein:
the magnetically actuated switch has a first switch end and a second switch end through which current can flow when the first switch end and the second switch end are coupled together, and
the magnetically actuated switch is adapted to decouple the first switch end and the second switch end when a sufficient flux is flowing through the magnetically actuated switch, and is adapted to couple the first switch end and the second switch end when said sufficient flux is not flowing through the magnetically actuated switch.

28. The apparatus of claim 24, wherein the plurality of members comprise additional flux conductors repositionable to selectively conduct flux between the magnet and the magnetically actuated switch.

29. The apparatus of claim 24, wherein the plurality of members comprise at least one flux shunt repositionable to selectively conduct flux between the magnet and the magnetically actuated switch.

30. The apparatus of claim 24, wherein the plurality of members are configured to reposition the flux conductors.

31. The apparatus of claim 24, wherein at least one of the plurality of members impart reluctance to a path to reduce flux flow between the magnet and the magnetically actuated switch.

32. The apparatus of claim 24, wherein the magnetically actuated switch is a single pole double throw switch configured to implement a NOT function.

33. The apparatus of claim 24, wherein the plurality of members are repositionable to allow flux to flow through one of a plurality of paths between the magnet and the magnetically actuated switch to implement an OR function.

34. The apparatus of claim 24, wherein the plurality of members are repositionable to allow flux to flow between the magnet and the magnetically actuated switch through all of the members to implement an AND function.

35. The apparatus of claim 1, wherein the permanent magnet, first magnetic end flux conductor, and second magnetic end flux conductor are connected in a rotatable magnet assembly adapted to allow the first magnetic end flux conductor and the second magnetic end flux conductor to rotate in unison into and out of alignment with the first switch end flux conductor and the second switch end flux conductor, respectively, to decrease and to increase the first gap and the second gap.

36. The apparatus of claim 35, further comprising one or more flux shunts positioned along a path of rotation of the rotatable magnet assembly adjacent to the first switch end flux conductor and/or the second switch end flux conductor.

37. The apparatus of claim 1, wherein:
the first switch end flux conductor is comprised of a lower first switch end flux conductor and an upper first switch end flux conductor, a third gap being between the lower first switch end flux conductor and the upper first switch end flux conductor;
the second switch end flux conductor is comprised of a lower second switch end flux conductor and an upper second switch end flux conductor, a fourth gap being between the lower second switch end flux conductor and the upper second switch end flux conductor;
the permanent magnet, first magnetic end flux conductor, and second magnetic end flux conductor are connected in a first rotatable assembly adapted to allow the first magnetic end flux conductor and the second magnetic end flux conductor to rotate in unison into and out of alignment with the lower first switch end flux conductor and the lower second switch end flux conductor, respectively, to decrease and to increase the first gap and the second gap; and the lower first switch end flux conductor and the lower second switch end flux conductor are connected in a second rotatable assembly adapted to allow the lower first switch end flux conductor and the lower second switch end flux conductor to rotate in unison into and out of alignment with the first magnetic end flux conductor and the second magnetic end flux conductor, respectively, to decrease and to increase the first gap and the second gap, and to rotate in unison into and out of alignment with the upper first switch end flux conductor and the upper second switch end flux conductor, respectively, to decrease and to increase the third gap and the fourth gap.

38. The apparatus of claim 37, wherein the first rotatable assembly is rotatable about a first axis and the second rotatable assembly is rotatable about a second axis, the first axis and the second axis being perpendicular.

39. The apparatus of claim 38, further comprising:

a first flux shunt positioned along a path of rotation of the first rotatable assembly about the first axis adjacent to the lower first switch end flux conductor and/or the lower second switch end flux conductor; and a second flux shunt positioned along a path of rotation of the second rotatable assembly about the second axis adjacent to the upper first switch end flux conductor and/or upper second switch end flux conductor.

* * * * *